United States Patent
Seto

(10) Patent No.: US 9,390,350 B2
(45) Date of Patent: Jul. 12, 2016

(54) IMAGE EDITING APPARATUS, IMAGE EDITING METHOD, AND NON TRANSITORY COMPUTER READABLE RECORDING MEDIUM FOR PREVIEWING IMAGE DATA

(71) Applicant: FUJIFILM Corporation, Tokyo (JP)

(72) Inventor: Satoshi Seto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/225,637

(22) Filed: Mar. 26, 2014

(65) Prior Publication Data

US 2014/0293304 A1 Oct. 2, 2014

(30) Foreign Application Priority Data

Mar. 27, 2013 (JP) ................................ 2013-066679

(51) Int. Cl.
   *G06K 15/00* (2006.01)
   *G06K 15/02* (2006.01)
   *G06T 11/60* (2006.01)

(52) U.S. Cl.
   CPC .......... *G06K 15/025* (2013.01); *G06K 15/1867* (2013.01); *G06T 11/60* (2013.01)

(58) Field of Classification Search
   CPC ......................... G06K 15/025; G06K 15/1867
   USPC .................................... 715/274; 358/1.12, 1.2
   See application file for complete search history.

(56) References Cited

U.S. PATENT DOCUMENTS

| 2009/0290169 | A1* | 11/2009 | Kobashi | ................ G06F 17/217 358/1.2 |
| 2011/0286040 | A1* | 11/2011 | Seto | ........................ G06T 11/60 358/1.15 |
| 2012/0020513 | A1 | 1/2012 | Outram | |

FOREIGN PATENT DOCUMENTS

| JP | 2004-193734 A | 7/2004 |
| JP | 2010-537298 A | 12/2010 |
| JP | 2011-242952 A | 12/2011 |
| JP | 2011-242977 A | 12/2011 |

OTHER PUBLICATIONS

Japanese Office Action issued in Japanese Application No. 2013-066679 on Feb. 10, 2015.

* cited by examiner

*Primary Examiner* — Benjamin O Dulaney
(74) *Attorney, Agent, or Firm* — Birch, Stewart, Kolasch & Birch, LLP

(57) ABSTRACT

Provided an image editing apparatus, image editing method, and a non-transitory computer readable recording medium that can faithfully visualize a degree of a position deviation amount of each page area generated at the time of a post-processing. An image editing apparatus, image editing method, and a non-transitory computer readable recording medium estimates a two-dimensional position deviation amount for each page area which is generated at the time of post-processing with respect to the printed matter based on the post-processing information relating to post-processing included in imposition data. Then, a preview image data indicating the virtual product is created by mapping a page image indicating the page area on the printed matter shifted as much as the deviation amount onto the page area on the virtual product.

17 Claims, 11 Drawing Sheets

IMAGE EDITING APPARATUS, IMAGE EDITING METHOD, AND NON TRANSITORY COMPUTER READABLE RECORDING MEDIUM FOR PREVIEWING IMAGE DATA

BACKGROUND OF THE INVENTION

1. Field of the Invention

The present invention relates to an image editing apparatus, an image editing method, and a non-transitory computer readable recording medium that visualize a virtual product obtained by simulating a final product which is obtained by a post-processing to at least one printed matter having a plurality of page areas.

2. Description of the Related Art

In recent years, in the field of printing plate manufacture, computer to plate (CTP) is widely used, in which a printing plate is directly formed from electronic data without creating an intermediate deliverable. Various types of proof technologies for creating and visualizing a virtual product obtained by simulating a form of a product (hereinafter, the final product) which is finally obtained by a printing process and post-processing using the electronic data, are proposed. As a result, since printing for proofreading becomes unnecessary and the result of the final product can be imaged at an earlier stage, it is more preferable than ever.

In JP2010-537298A, a method of displaying a three-dimensional electronic output expression of a document by generating a three-dimensional parametric model from content and geometric data, is proposed. Particularly, a method of obtaining accurate expressions by considering physical aberrations such as a creeping or a bottling, is disclosed (refer to Paragraph [0060] in JP2010-537298A).

In JP2011-242977A, an apparatus is proposed, which creates and displays three-dimensional preview data by extracting and mapping the print data that has been imposed, in page units, after performing a rasterizing processing.

SUMMARY OF THE INVENTION

However, in JP2010-537298A and JP2011-242977A, any specific means for reflecting physical aberrations or any influences of processing errors due to a post-processing system are not disclosed. In a case where a complicated post-processing is performed, sometimes the actual obtained physical aberrations or the processing errors cannot be appropriately expressed simply in a moving processing along a throat side (or an edge side) and a rotation processing with a fixed point as a center. In other words, there exists enough room for an improvement from the viewpoint of faithfully reproducing the position of each page area in the final product.

The present invention is made in order to solve the above-described problem and an object thereof is to provide an image editing apparatus, an image editing method, and a non-transitory computer readable recording medium that can faithfully visualize a degree of the position deviation of each page area, which is generated in the post-processing.

An image editing apparatus in the present invention visualizes a virtual product obtained by simulating a final product which is obtained by a post-processing to at least one printed matter having a plurality of page areas. The apparatus includes: a data acquisition unit that acquires imposition data for imposing a plurality of page areas on a sheet on which the printed matter is formed, and mapping data that indicates a correspondence relationship of the page areas between the printed matter and the virtual product; a position deviation amount estimation unit that estimates a two-dimensional position deviation amount for each page area which is generated at the time of post-processing with respect to the printed matter, based on the post-processing information relating to the post-processing included in the imposition data acquired by the data acquisition unit; and an image creation unit that creates preview image data indicating the virtual product by mapping a page image indicating the page area on the printed matter shifted as much as the position deviation amount estimated by the position deviation amount estimation unit onto the page area on the virtual product with reference to the mapping data acquired by the data acquisition unit.

In this way, since there are provided a position deviation amount estimation unit that estimates a two-dimensional position deviation amount for each page area which is generated at the time of post-processing with respect to the printed matter, based on the post-processing information relating to the post-processing, and an image creation unit that creates preview image data indicating the virtual product by mapping a page image indicating the page area on the printed matter shifted as much as the estimated position deviation amount onto the page area on the virtual product, it is possible to appropriately reflect the position deviation generated at the time of post-processing as the two-dimensional position deviation for each page area in the form of the virtual product. Thus, the degree of position deviation for each page area generated at the time of post-processing can be faithfully visualized.

It is preferable that the image creation unit create the preview image data that visualizes the virtual product using a three-dimensional shape model.

It is preferable that a sheet thickness of the sheet and sheet folding information of the printed matter be included in the post-processing information, and the position deviation amount estimation unit estimate the deviation amount generated at the time of sheet folding processing of the printed matter using the sheet thickness and the sheet folding information.

It is preferable that the position deviation amount estimation unit partition the printed matter into a fixed-side area where the position is fixed at the time of folding processing and a non-fixed-side area where the position is not fixed respectively with at least one folding line specified from sheet folding information as a reference, and estimate the deviation amount accumulated in each page area belonging to the non-fixed-side area.

It is preferable that cutting information of the printed matter be included in the post-processing information, and the position deviation amount estimation unit estimate the deviation amount generated at the time of the cutting processing of the printed matter using the cutting information.

It is preferable that the image creation unit create the preview image data indicating the virtual product in which a cut out area exists or does not exist, according to the instruction operation of a user.

It is preferable that the image editing apparatus further include a display unit that displays the virtual product based on the preview image data created by the image creation unit.

An image editing method in the present invention is a method in which the image editing apparatus is used, which visualizes a virtual product obtained by simulating a final product which is obtained by a post-processing to at least one printed matter having a plurality of page areas. The method includes a step of acquiring imposition data for imposing a plurality of page areas on a sheet on which the printed matter is formed, and mapping data that indicates a correspondence relationship of the page areas between the printed matter and the virtual product; a step of estimating a two-dimensional position deviation amount for each page area which is generated at the time of post-processing with respect to the printed matter, based on the post-processing information relating to the post-processing included in the imposition data acquired by the data acquisition unit; and a step of creating preview image data indicating the virtual product by mapping a page image indicating the page area on the printed matter shifted as much as the estimated position deviation amount onto the page area on the virtual product with reference to the acquired mapping data.

A non-transitory computer readable recording medium in the present invention is a program for visualizing a virtual product obtained by simulating a final product which is obtained by a post-processing to at least one printed matter having a plurality of page areas. The non-transitory computer readable recording medium causes a computer to execute a step of acquiring imposition data for imposing a plurality of page areas on a sheet on which the printed matter is formed, and mapping data that indicates a correspondence relationship of the page areas between the printed matter and the virtual product; a step of estimating a two-dimensional position deviation amount for each page area which is generated at the time of post-processing with respect to the printed matter, based on the post-processing information relating to the post-processing included in the imposition data acquired by the data acquisition unit; and a step of creating preview image data indicating the virtual product by mapping a page image indicating the page area on the printed matter shifted as much as the estimated position deviation amount onto the page area on the virtual product with reference to the acquired mapping data.

According to an image editing apparatus, an image editing method, and a non-transitory computer readable recording medium, a two-dimensional position deviation amount for each page area which is generated at the time of post-processing with respect to the printed matter is estimated based on the post-processing information relating to the post-processing, and preview image data indicating the virtual product is created by mapping a page image indicating the page area on the printed matter shifted based on the estimated position deviation amount onto the page area on the virtual product. Therefore, it is possible to appropriately reflect the position deviation generated at the time of post-processing as the two-dimensional position deviation for each page area in the form of the virtual product. Thus, the degree of position deviation for each page generated at the time of post-processing can be faithfully visualized.

DESCRIPTION OF THE PREFERRED EMBODIMENTS

Hereinafter, an image editing method in the present invention will be described with preferable embodiments in connection with an image editing apparatus and a non-transitory computer readable recording medium for performing the same, with reference to the drawings. In the present specification, there is a case where forming an image is referred to as "printing".

Overall Configuration of the Printed Matter Production System 10

Figure 1:
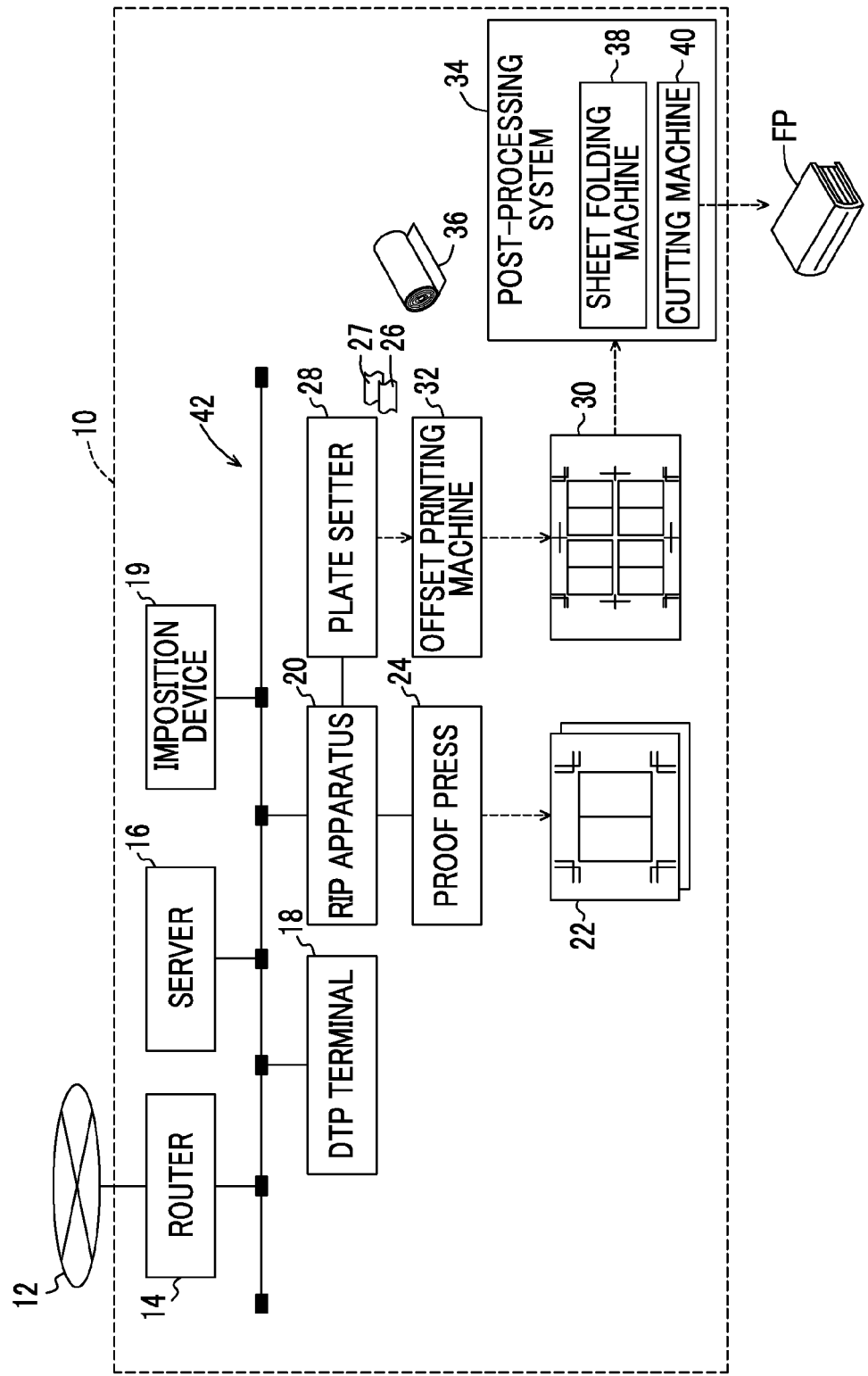
FIG. 1 is an overall block diagram of a printed matter production system in which an RIP apparatus is assembled as an image editing apparatus in the present embodiment.

FIG. 1 is an overall block diagram of a printed matter production system 10 in which a raster image processor (RIP) apparatus 20 is assembled as an image editing apparatus in the embodiment.

In the printed matter production system 10, there are provided: a router 14 that is a device for relaying a connection to a network 12, a server 16 which each terminal (not illustrated) belonging to an external network can access via the network 12, a DTP terminal 18 for performing a desktop publishing (DTP) including an editing of content data obtained from the server 16, an imposition device 19 for the imposition of the content data processed by the DTP terminal 18, a RIP apparatus 20 (image editing apparatus) that performs each image processing such as the rasterizing processing or color conversion processing based on the plate making data (or printing plate data) imposed by the imposition device 19, and a proof press 24 that can print a proof 22 based on the processed proof data transmitted from the RIP apparatus 20, a plate setter 28 that makes printing plates 26 and 27 based on the plate making data transmitted from the RIP apparatus 20, an offset printing machine 32 that can print a printed matter 30 with the printing plates 26 and 27 being mounted, and a post-processing system 34 that obtains a final product FP by performing a post-processing to at least one sheet of the printed matter 30, respectively.

The server 16 is a core device for the workflow management in the printed matter production system 10. The server 16 is communicatively connected to each terminal device that is included in, for example, a design or a production company (not illustrated) via the router 14 and the network 12. The server 16 is communicatively connected to the DTP terminal 18, imposition device 19, and RIP apparatus 20 via a local area network (LAN) 42 that is built into the printed matter production system 10.

That is, the server 16 is configured to be capable of executing each of functions: as a file server that manages storage and transmission of various data files; as an authority management server that manages the executable rasterizing authority in each terminal, each user, or each printing job; or as a mail server that generates and distributes a notification mail at the predetermined timing of starting and ending of each process. Examples of the various data files that can be managed by the server 16 as the file server include content data, the proof data, plate making data, a job ticket (for example, a job definition (JDF) file), an international color consortium (ICC) profile, and color sample data.

The DTP terminal 18 creates image data in page units (hereinafter, also referred to as page images) after performing a preflight processing with respect to content data that is configured with characters, figures, patterns and pictures. The imposition device 19 performs an imposition processing according to a designated binding method and a folding method with reference to tag information of the job ticket. The "imposition" is assigning a vertical direction and a position with respect to each page of the printed matter such that the page is arranged in a desired manner in a case where a folded section is formed.

The RIP apparatus 20 functions as a printing process server with respect to at least one type of printing machine. In FIG. 1, the RIP apparatus 20 is communicatively connected to the proof press 24 and the plate setter 28. In this case, the RIP apparatus 20 converts data described in a form of page description language (PDL) (hereinafter, also referred to as page description data) into print data suitable for each output device, and then, supplies the print data to the proof press 24 or the plate setter 28.

The proof press 24 prints the proof 22 based on the print data supplied from the RIP apparatus 20. Direct digital color proofing (DDCP), an ink jet color proofer, and a low resolution color laser printer (electro-photographic system) or an inkjet printer may also be used as the proof press 24.

The offset printing machine 32 outputs the printed matter 30 on which the image is formed on a front surface 100 and a back surface 101 (refer to FIG. 4) of a sheet 36 by depositing ink on each main surface of the sheet 36 (printing medium) via the printing plates 26 and 27 and an intermediate transfer member (not illustrated). Instead of the offset printing machine 32, a digital printer for direct printing may be provided. As the digital printer, an inkjet printer, a wide format printer, an inkjet color proofer, or a color laser printer (electro-photographic system) may be used.

In the post-processing system 34, a sheet folding machine 38 that forms a folded section by folding the printed matter 30, and a cutting machine 40 that cuts a not necessary portion of the folded section (cut off portion) or cuts and divides the printed matter 30 into a plurality of folded sections are provided. The configuration of the post-processing system 34 is not limited to this, but various devices corresponding to the forms of final product FP such as a collating machine, a binding machine, or a glossing machine may be provided.

Electrical Block Diagram of RIP Apparatus 20

Figure 2:
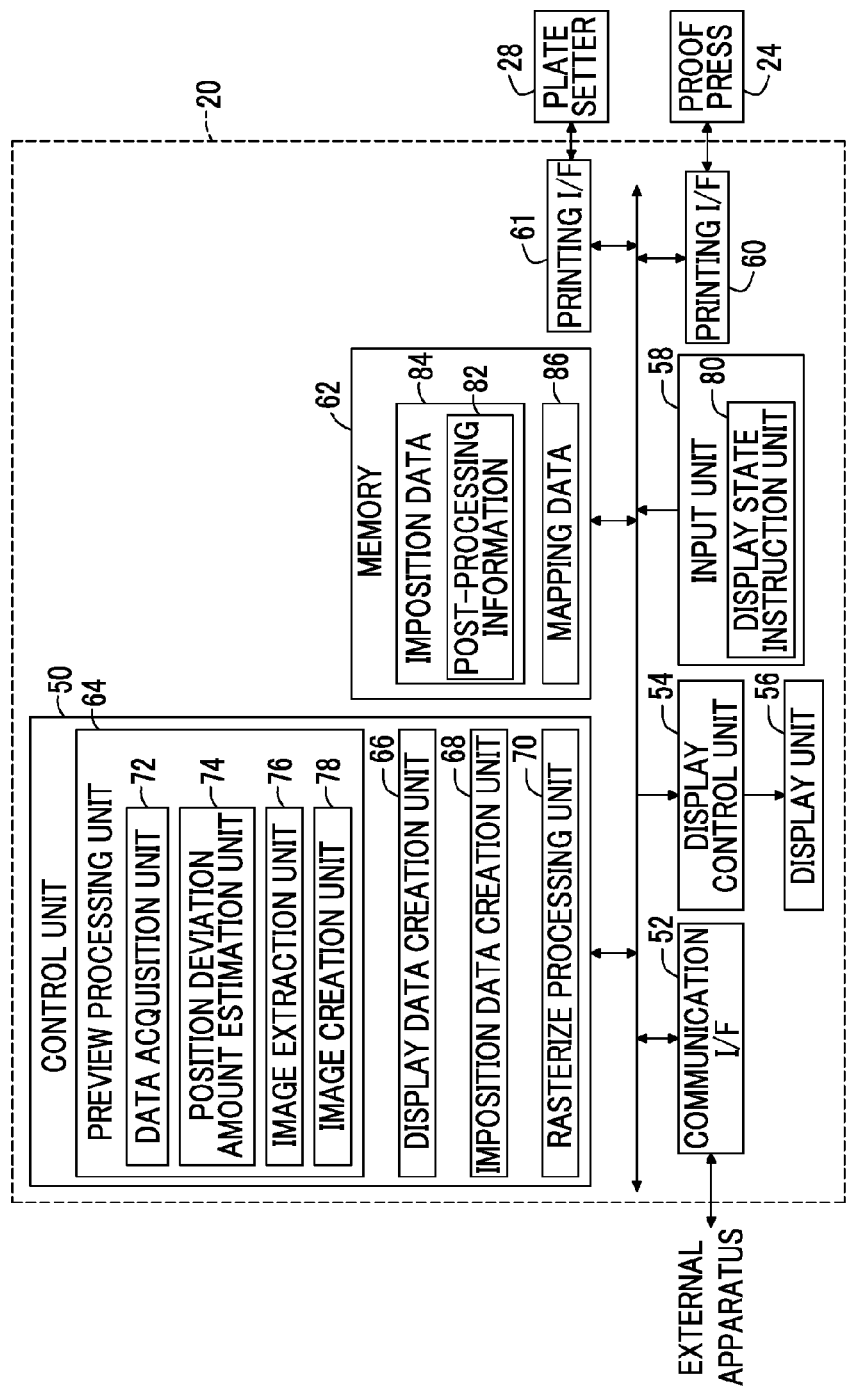
FIG. 2 is an electrical block diagram of the RIP apparatus illustrated in FIG. 1.

FIG. 2 is an electrical block diagram of the RIP apparatus 20 illustrated in FIG. 1. The RIP apparatus 20 is a computer that includes a control unit 50, a communication I/F unit 52, a display control unit 54, a display unit 56, an input unit 58, printing I/F's 60 and 61, and a memory 62 (recording medium).

The communication I/F unit 52 is an interface that receives and transmits an electrical signal from the external devices. The communication I/F unit 52 can acquire various information such as plate making data, print data, the job ticket, and an ICC profile, which are managed and stored in the server 16 (refer to FIG. 1).

The display control unit 54 is a control circuit that controls the driving of the display unit 56 according to the control of the control unit 50. The display unit 56 is driven by the display control signal being output to the display unit 56 by the display control unit 54 via a not illustrated I/F. In this way, the display unit 56 can display various images including a window W (refer to FIGS. 11A and 11B).

The printing I/F's 60 and 61 are interfaces that transmit an electrical signal as print data. The proof press 24 prints the desired proof 22 by receiving the predetermined electrical signal from the printing I/F 60. The plate setter 28 makes desired printing plates 26 and 27 by receiving the predetermined electrical signal from the printing I/F 61.

The memory 62 stores a program, data, and the like necessary for the control unit 50 to control each of the configuration components. In FIG. 2, imposition data 84 that includes information relating to the post-processing (hereinafter, post-processing information 82) and mapping data 86 that indicates a correspondence relationship of a page area (that is, position) between the printed matter 30 and the virtual product VP, are stored in the memory 62.

The memory 62 may be configured to be a non-transitory computer readable recording medium. Here, the non-transitory computer readable recording medium is a storage medium including a portable medium such as an optical magnetic disc, a ROM, a CD-ROM, a flash memory, and a storage device such as a hard disk which is built into the computer system. The storage medium may be one that holds the program dynamically for a short period of time, or may be one that holds the program for a certain period of time.

The control unit 50 is configured to include a processor such as a central processing unit (CPU). The control unit 50 realizes each function of a preview processing unit 64, a display data creation unit 66, an imposition data creation unit 68, and a rasterizing processing unit 70, by reading the programs stored in the memory 62.

The preview processing unit 64 creates a preview image data that indicates a virtual product VP (FIG. 11A and FIG. 11B) which simulates the final product FP, based on various data provided for the production of the final product FP.

Specifically, the preview processing unit 64 includes a data acquisition unit 72 that acquires various data including imposition data 84 and mapping data 86, a position deviation amount estimation unit 74 that estimates a two dimensional position deviation amount for each page area 108 (refer to FIG. 4) generated at the time post-processing with respect to the printed matter 30, a page image extraction unit 76 that extracts the image of page unit (hereinafter, page image 170, refer to FIG. 10B), and an image creation unit 78 that creates the preview image data that indicates the virtual products VP.

The display data creation unit 66 creates display data for displaying the window W (refer to FIG. 11A and FIG. 11B) including the virtual product VP on the display unit 56. The imposition data creation unit 68 creates the imposition data 84 for arranging a plurality of content images on the sheet 36 or the printing plates 26 and 27.

The rasterizing processing unit 70 performs rasterizing with respect to the page description data in which the imposition processing is completed. The rasterizing processing includes a data format conversion processing in which a PDL format is converted into a raster format and a color matching processing using an ICC profile.

The input unit 58 is configured to include various input devices such as a mouse, a track ball, and a key board. By combining the display function of the display unit 56 and the input function of the input unit 58, a user interface can be realized. In this case, the input unit 58 functions as a display form instruction unit 80 that instructs a display mode or a display state of the virtual product VP.

Operation of the RIP Apparatus 20

Figure 3:
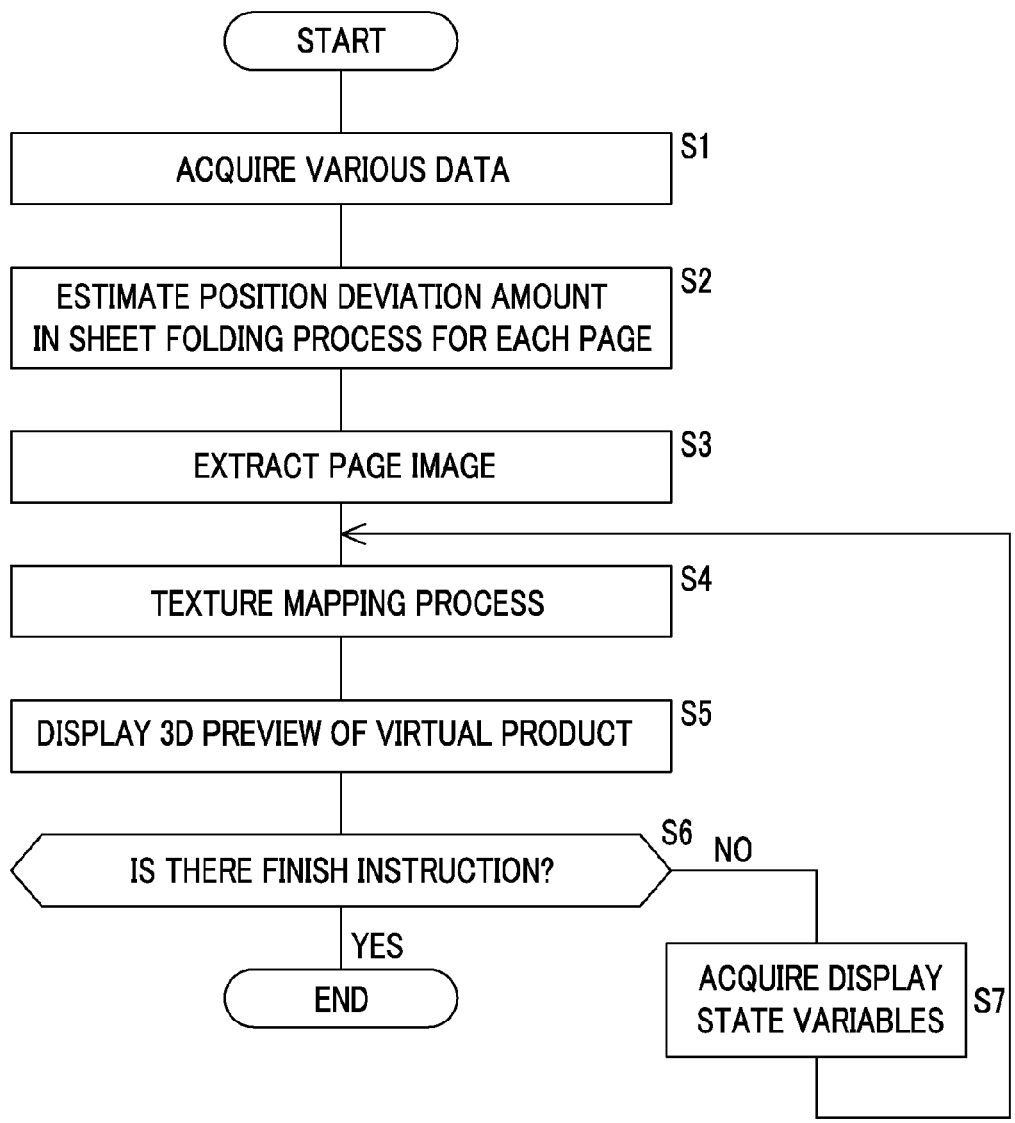
FIG. 3 is a flow chart provided for explaining an operation of the RIP apparatus illustrated in FIG. 1 and FIG. 2.

The RIP apparatus 20 as the image editing apparatus in the present embodiment is configured as described above. Subsequently, the operation of the RIP apparatus 20 will be described in detail with reference to the block diagram in FIG. 3.

An operator as a user usually performs proofreading work for the printed proof 22 using the proof press 24 illustrated in FIG. 1. In the present embodiment, instead of printing the proof 22, the virtual product VP simulating the form of the final product FP will be visualized and displayed.

In STEP S1, the data acquisition unit 72 acquires various data for visualizing the virtual product VP which is subject of the proofreading. The data acquisition unit 72 acquires, specifically, content data, the imposition data 84 (including post-processing information 82), and the mapping data 86. Various information relating to the post-processing, for example, sheet information (types or thickness (sheet thickness) of the sheet 36), sheet folding information relating to the folding of the sheet 36, and cutting information relating to the cutting of the sheet 36 may be included in the post-processing information 82.

As the sheet folding information, a position, a posture, an order and a type (valley fold or mountain fold) of the sheet folding, position determination information at the time of sheet folding, and a unique accuracy of the sheet folding machine 38, can be exemplified. As the cutting information, a position, a posture and an order of cutting, position determination information at the time of cutting, and a unique accuracy of the cutting machine 40, can be exemplified.

Figure 4:
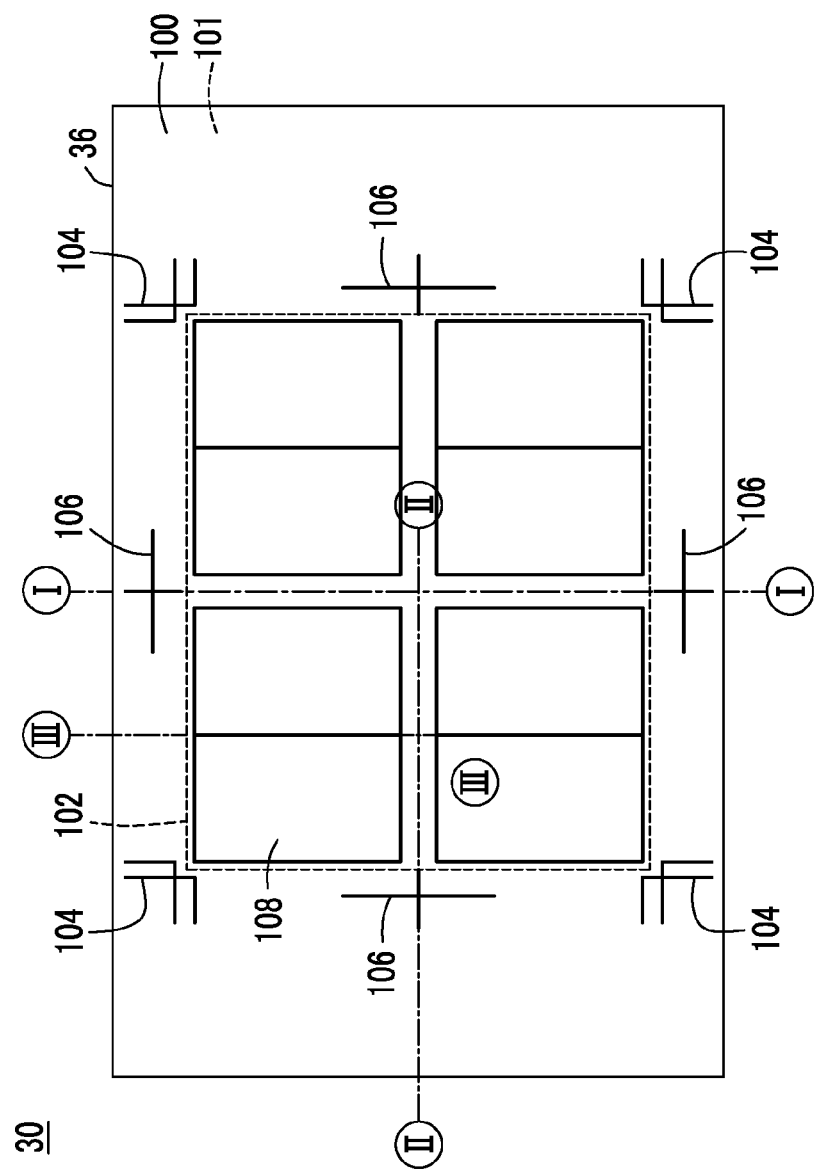
FIG. 4 is a schematic front view of a printed matter illustrated in FIG. 1.

FIG. 4 is a schematic front view of the printed matter 30 illustrated in FIG. 1, and corresponds to the drawing form specified from the content of the imposition data 84.

On the front surface 100 and the back surface 101 of the sheet 36, a plate surface 102 representing the page allocation of 8 pages and two types of crop marks 104 and 106 for matching the direction, are printed respectively. The crop marks 104 and 106 are marks for indicating the position of finishing or the position designating the reserved cutting. Eight page areas 108 (four pairs) having the same size are included in the plate surface 102 of each surface. With respect to the printed matter 30, by sequentially performing (1) a valley-folding along the line I-I, (2) a valley-folding along the line II-II, and (3) a valley-folding along the line III-III, one folded section in a unit of 16 pages of which each page is arranged in a correct order.

In STEP S2, the position deviation amount estimation unit 74 estimates the two dimensional position deviation amount (hereinafter, also referred to as position deviation amount) generated at the time of post-processing with respect to the printed matter 30 for each page area 108 based on post-processing information 82 obtained in STEP S1. Various processing such as a sheet folding processing, a collating processing, a binding processing, and a cutting processing can be considered as the post-processing. Hereinafter, a specific estimation method at the time of sheet folding processing will be described in detail with reference to FIG. 5A to FIG. 8B.

Figure 5A:
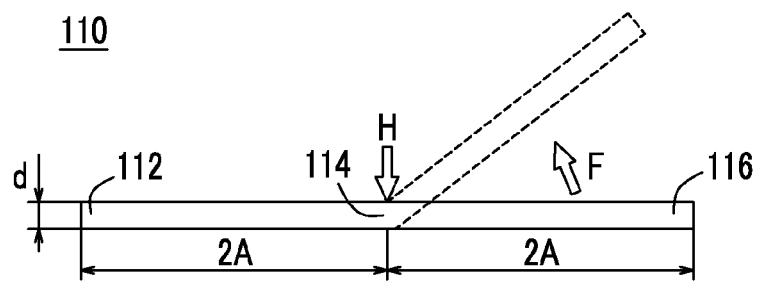
FIG. 5A to FIG. 5C are schematic explanatory diagrams regarding an estimation model of the position deviation amount generated at the time of sheet folding processing.
Figure 5B:
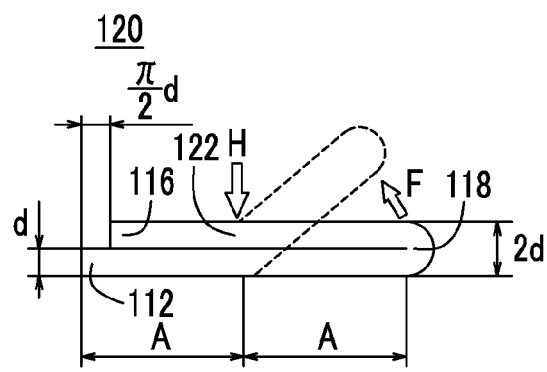
Figure 5C:
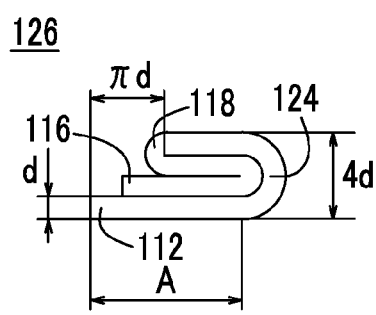

FIG. 5A to FIG. 5C are schematic explanatory diagrams regarding an estimation model of the position deviation amount generated at the time of a sheet folding process. Here, it is assumed that the printed sheet 110 having a side length of 4 A and a thickness (sheet thickness) of d is sequentially folded. In each figure, for the sake of convenience in describing, the thickness direction of the printed sheet 110 is exaggeratedly illustrated.

As illustrated in FIG. 5A, when one end portion 116 of a printed sheet 110 is moved in a direction along an arrow F in the state of another end portion 112 side being fixed and the center portion 114 being pushed in a direction of an arrow H, a first intermediate 120 having a bent portion 118 is formed as illustrated in FIG. 5B.

The position of one end portion 112 of the first intermediate 120 ideally coincides with the position of another end portion 116. However, actually, with the center of the sheet thickness as a reference point, at the bent portion 118, there occurs a length loss of a half arc of which the diameter is the thickness d of the sheet. As a result, the actual position of another end portion 116 is deviated to the bent portion 118 side by a deviation amount ($\pi d/2$) with one end portion 112 as a reference.

Subsequently, when the bent portion 118 is moved in a direction along the arrow F in the state that one end portion 112 side of the first intermediate 120 is fixed and the center portion 122 is pushed in a direction of the arrow H, a second intermediate 126 having a bent portion 124 is formed as illustrated in FIG. 5C.

The position of one end portion 112 of the second intermediate 126 ideally coincides with the position of the bent portion 118. However, actually, at the bent portion 124, there occurs a length loss of a half arc of which the diameter is the thickness d of two sheets (that is, 2d). As a result, the actual position of the bent portion 118 is deviated to the bent portion 124 side by a deviation amount ($\pi d$) with one end portion 112 as a reference. In this way, by partitioning the printed sheet into a fixed-side area where the position is fixed at the time of folding processing and a non-fixed-side area where the position is not fixed respectively with at least one folding line specified from sheet folding information as post-processing information 82 as a reference, it is possible to estimate the deviation amount accumulated in each page area 108 belonging to the non-fixed-side area.

Then, by two-dimensionally expanding the estimation model described above, it is possible to estimate the deviation amount ($\alpha X$, $\alpha Y$) for each page area 108 with high accuracy. Hereinafter, a detailed description will be made according to the form of folded section formed from the printed matter 30 illustrated in FIG. 4 with reference to FIG. 6A to FIG. 8B.

For example, with an upper left corner of the surface 100 side of the printed matter 30 (FIG. 4) as a reference point, the longitudinal direction is defined as an X axis and the short direction is defined as a Y axis. In this case, the positive direction of the X axis corresponds to a direction toward the left side from the right side of a front page area 130 (refer to FIG. 6A) on the back surface 101 side. The positive direction of the Y axis corresponds to a direction toward the lower side from the upper side of the front page area 130.

As illustrated in 6A, the sheet folding machine 38 folds the printed matter 30 in half by valley-folding in a direction of an arrow F1 along the folding line 134 in the state that the position is determined to be the fixed area 132 side. In this case, the position deviation amount of each page area 108 belonging to the non-fixed-side area 136 illustrated in dotted lines is updated. Specifically, the position deviation amount estimation unit 74 adds $k \cdot \pi d/2$ to the X component as a position deviation amount of each of four page areas 108 (eight in both sides) which are subject to the updates. Here, k is a positive constant depending on the type of the sheet 36, and theoretically k=1.

Incidentally, in the case of the sheet folding machine 38 having a general function, the position of the sheet folding mechanism is fixed. For this reason, it is necessary to align the folding direction (that is, folding line) in a constant direction by appropriately changing the position and the posture of the printed matter 30 in line with the sheet folding mechanism of the sheet folding machine 38 before performing the sheet folding processing.

Figure 6A:
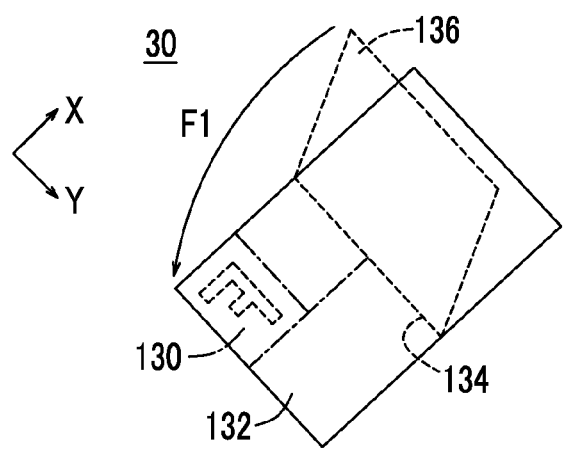
FIG. 6A to FIG. 6C are first schematic diagrams schematically illustrating the sheet folding processing of the printed matter.
Figure 6B:
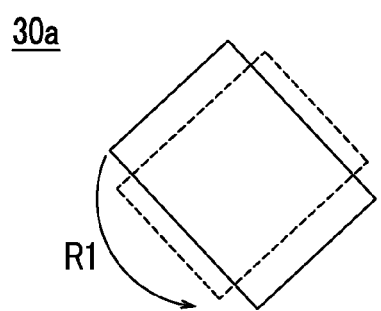
Figure 6C:
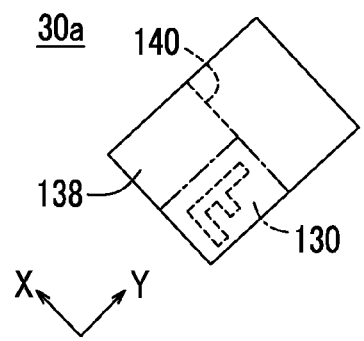

As illustrated in FIG. 6B, the sheet folding machine 38 rotates the two-folded printed matter 30 (hereinafter, referred to as two-folded printed matter 30a) by 90° in a direction along an arrow R1. As understood from FIG. 6C, it is noted that the direction (X axis, Y axis) of the position deviation is changed with the change of the direction of the two-folded printed matter 30a.

As illustrated in 7A, the sheet folding machine 38 folds the two-folded printed matter 30a in half by valley-folding in a direction of an arrow F2 along the folding line 140 in the state that the position is determined to be the fixed area 138 side. In this case, the position deviation amount of each page area 108 belonging to the non-fixed-side area 142 illustrated in dotted lines is updated. Specifically, the position deviation amount estimation unit 74 adds $k \cdot \pi d$ to the Y component as a position deviation amount of each of two page areas 108 (four in both sides) which are subject to be updated.

Figure 7A:
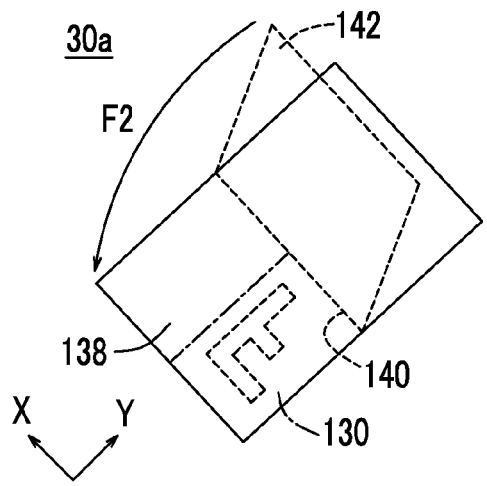
FIG. 7A to FIG. 7C are second schematic diagrams schematically illustrating the sheet folding processing of the printed matter.
Figure 7B:
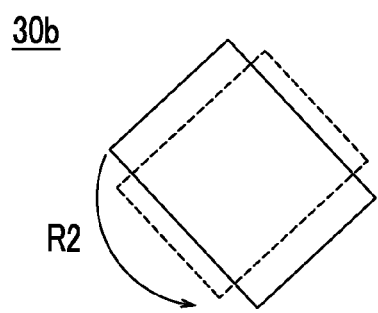
Figure 7C:
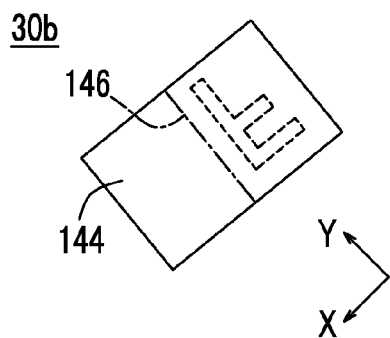

As illustrated in FIG. 7B, the sheet folding machine 38 rotates the two-folded two-folded printed matter 30a (hereinafter, referred to as four-folded printed matter 30b) by 90° in a direction along an arrow R2. As understood from FIG. 7C, it is noted that the direction (X axis, Y axis) of the position deviation is changed with the change of the direction of the four-folded printed matter 30b.

Figure 8A:
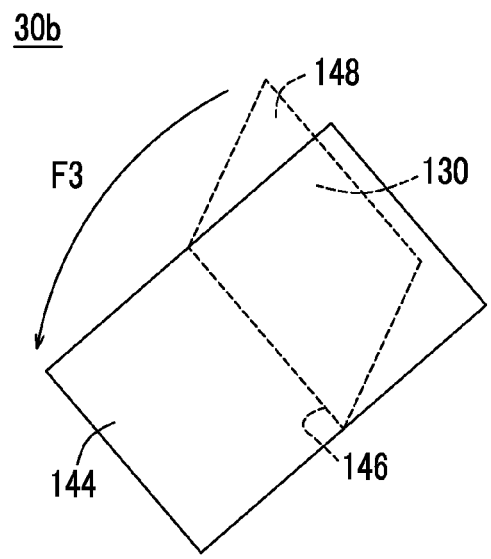
FIG. 8A to FIG. 8B are third schematic diagrams schematically illustrating the sheet folding processing of the printed matter.

As illustrated in FIG. 8A, the sheet folding machine 38 folds the four-folded printed matter 30b in half by valley-folding in a direction of an arrow F3 along the folding line 146 in the state that the position is determined to be the fixed area 144. In this way, the eight-folded printed matter 30, that is, folded section 30c is formed.

Figure 8B:
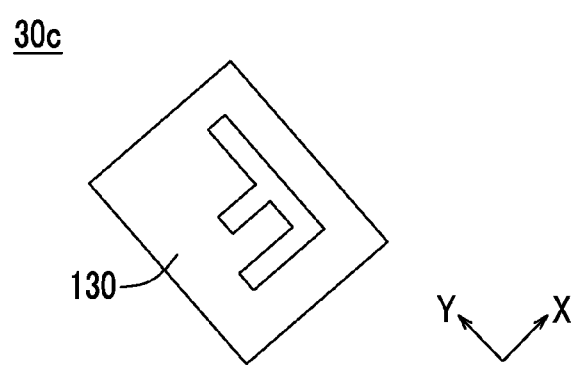

As understood from FIG. 8B, it is noted that the direction (X axis) of the position deviation is changed along with the conversion of the front page area 130 that includes the reference point. In this case, the position deviation amount of each page area 108 belonging to the non-fixed-side area 148 illustrated in dotted lines is updated. Specifically, the position deviation amount estimation unit 74 adds $k \cdot 2\pi d$ to the X component as a position deviation amount of each page area 108 (two in both sides) which are subject to the updates.

In this way, the position deviation amount estimation unit 74 can estimate the position deviation amount in X axis and Y axis ($\Delta X$, $\Delta Y$) for each page area 108 (STEP S2). The estimation method is not limited to the method described above, and various estimation models can be applied. The position deviation amount estimation unit 74 may perform the estimation based on an actual measured value in addition to this calculated estimation or without this calculated estimation. For example, the position deviation amount ($\Delta X$, $\Delta Y$) may be estimated based on a specific processing accuracy of the sheet folding machine 38 or the cutting machine 40.

In STEP S3, a page image extraction unit 76 respectively extracts the page image 170 provided for the texture mapping described below. Prior to the texture mapping process, a three-dimensional shape model 160 is determined in advance according to the shape of the final product FP. The texture mapping is a method for applying a texture on the surface of an object in three dimensional computer graphics.

Figure 9:
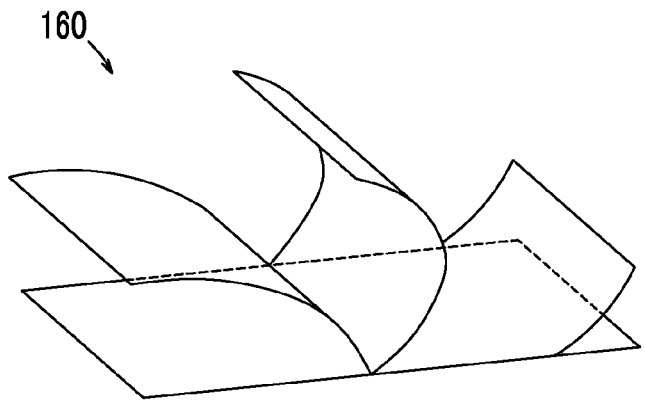
FIG. 9 is a schematic perspective view illustrating an example of a three-dimensional shape model.

FIG. 9 is a schematic perspective view illustrating an example of a three-dimensional shape model 160. The three-dimensional shape model 160 expresses the three-dimensional shape of a book on which a plurality of folded section 30c is superimposed. Upon this modeling, physical characteristics such as a degree of deflection of the sheet 36 or glossiness may be reflected.

The rasterizing processing unit 70 creates proofread data 162 that is the same as or similar to the actual print data using a not illustrated content image and the imposition data 84. Then, the page image extraction unit 76 extracts the page image 170 which corresponds to the page area 108 (FIG. 4) by considering the position deviation amount ($\Delta X$, $\Delta Y$) estimated in STEP S2.

Figure 10A:
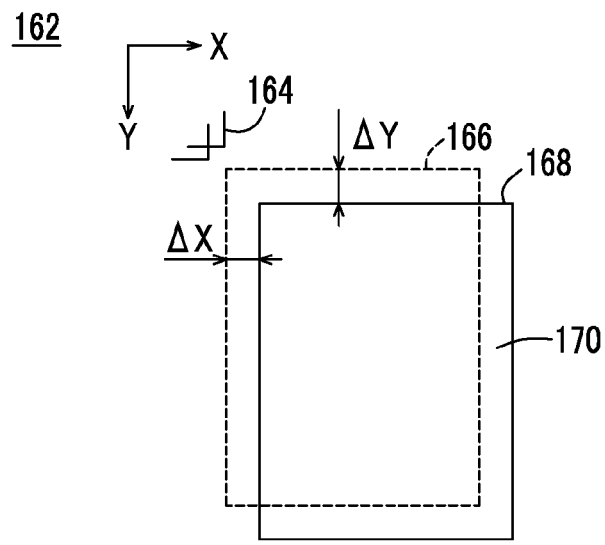
FIG. 10A is a schematic explanatory diagram relating to a method of extracting a page image.

FIG. 10A is a schematic explanatory diagram relating to a method of extracting a page image 170. In FIG. 10A, as a part of proofread data 162, the crop mark 164 which corresponds to the crop mark 104 (FIG. 4) is indicated. A rectangular frame indicated with the dotted line is an ideal page area (hereinafter, referred to as page area before shift 166) that is uniquely determined by the crop mark 164. In contrast, a rectangular frame indicated with a real line is a page area (hereinafter, referred to as shifted page area 168) that is respectively shifted by $\Delta X$ in the X axis direction and $\Delta Y$ in the Y axis direction with respect to the position of the page area before shift 166.

The page image extraction unit 76 obtains the page image 170 by extracting the image in the shifted page area 168 from the proofread data 162. Here, all of the page images 170 that can be subject to display may be obtained in advance, or the page number that is currently subject to display and the page image 170 of surrounding may be obtained timely.

In STEP S4, the image creation unit 78 creates a preview image data by mapping the page image 170 that is extracted in STEP S3 onto the page area of the virtual product VP (hereinafter, referred to as virtual page area 172) referring to the mapping data 86.

Figure 10B:
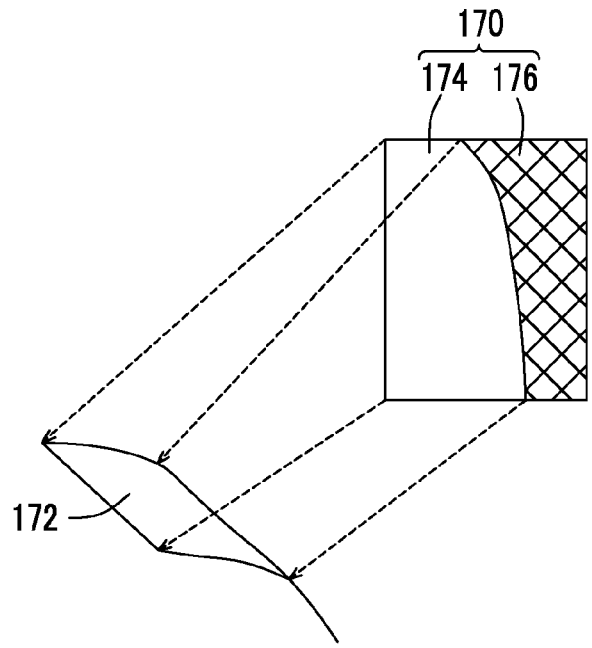
FIG. 10B is a schematic explanatory diagram relating to a method of mapping of the page image.

FIG. 10B is a schematic explanatory diagram relating to a method of mapping of the page image 170. The virtual page area 172 in FIG. 10B indicates the shape of one page being turned over in perspective. The image creation unit 78 performs a mapping of a part of the rectangular-shaped page image 170 (visible area 174) onto the virtual page area 172 using the known method of texture mapping. The hatched area of the page image 170 is a non-visible area 176 that is not represented on the virtual product VP in this display mode.

In STEP S5, the RIP apparatus 20 performs a three-dimensional preview display of the virtual product VP based on the preview image data created in STEP S4. Prior to the display, the display data creation unit 66 creates display data of a preview screen 180 (refer to FIG. 11A), and then supplies the display data to the display control unit 54. Then, the display control unit 54 causes the window W (including the preview screen 180) to be displayed on the display unit 56.

Figure 11A:
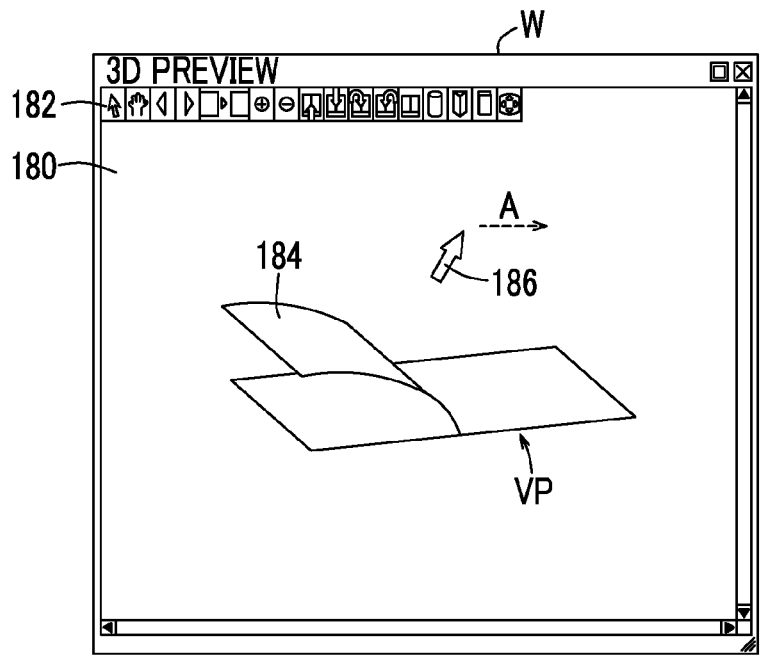
FIG. 11A and FIG. 11B are image views of 3D preview display of a virtual product.
Figure 11B:
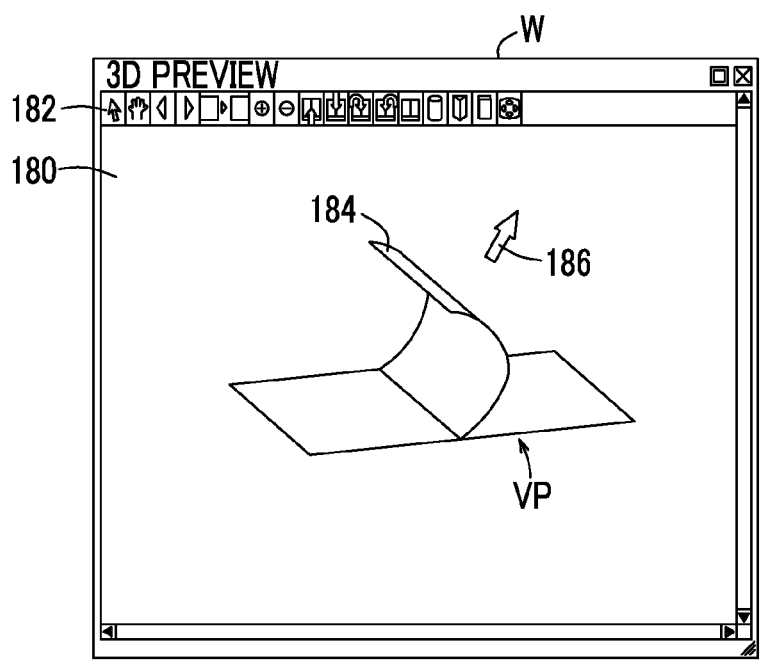

As illustrated in FIG. 11A, on the preview screen 180, the virtual product VP simulating the final product FP and a group of icons 182 that can change the settings relating to the display of the virtual product VP, are disposed. The virtual product VP indicates the shape of one page 184 being turned over in perspective.

In STEP S6, the control unit 50 determines whether or not there is an instruction to finish the preview display. In a case where there is no instruction (NO in STEP S6), the process proceeds to the next STEP S7.

In STEP S7, the preview processing unit 64 acquires a state variable (hereinafter, display state variable) that indicates the current display form of the virtual product VP from the display form instruction unit 80. As the display state variable, various variables displayed by three-dimensional computer graphics (3DCG) may be adapted. The example of the display state variable includes an observation state of the virtual product VP (a display magnification, position, and posture), physical properties (sheet thickness and glossiness), and the page number that is subject to being displayed.

Then, returning to STEP S4, STEPs S4 to S7 are performed sequentially. In this way, it is possible to immediately change the form of the virtual product VP following the operation of the input unit 58 by the operator.

For example, in the state that a pointer 186 exists on the preview screen 180 in FIG. 11A, the operator performs a predetermined operation via the input unit 58, for example, a drag operation of a mouse (in a direction A) in addition to an operation of pressing a predetermined key of a keyboard. Then, as described in FIG. 11B, on the preview screen 180, the virtual product VP in which the page 184 is turned over from right side to left side in a predetermined amount, is displayed. Not being limited to the operation of the turning over of the page 184, various operations may be reproduced, including a rotation, inversion, display of expansion and reduction, deployment, and reconfiguration of the page 184.

It may be provided that whether or not the cut out area be additionally displayed on the virtual product VP be selectable. In this case, the image creation unit 78 acquires each page image 170 that includes the cut out area or each page image 170 that does not include the cut out area, and creates the virtual product VP according to the instruction operation of the operator. In this way, it is possible to check what is drawn according to the preference of the operator. Examples of the cut out area include trimming (finishing), bleeding (cutting margin) and creeping (the thickness of the sheet 36 and the space required to fold the sheet of each folded book).

On the other hand, returning to STEP S6, in a case where it is determined that there is an instruction to finish the preview display (YES in STEP S6), the RIP apparatus 20 finishes the visualizing and display of the final product FP.

Effects of the Invention

As described above, the RIP apparatus 20 in the present embodiment includes: a data acquisition unit 72 that acquires imposition data 84 for imposing on the sheet 36 on which the printed matter 30 is formed, and mapping data 86 that indicates a correspondence relationship of the page areas (108 and 172) between the printed matter 30 and the virtual product VP; and a position deviation amount estimation unit 74 that estimates a two-dimensional position deviation amount ($\Delta X$, $\Delta Y$) for each page area 108 which is generated at the time of post-processing with respect to the printed matter 30, based on the post-processing information 82 related to the post-processing included in the imposition data 84; and an image creation unit 78 that creates preview image data indicating the virtual product VP by mapping a page image 170 indicating the page area (shifted page area 168) on the printed matter 30 shifted based on the position deviation amount ($\Delta X$, $\Delta Y$) onto the page area (virtual page area 172) on the virtual product VP with reference to the mapping data 86.

Configuring in this manner, it is possible to appropriately reflect the position deviation of each page area 108 generated at the time of post-processing as the two-dimensional position deviation for each page area 108 in the form of the virtual product VP. For this reason, the degree of position deviation of each page area 108 generated at the time of post-processing can be faithfully visualized.

The present invention is not limited to the above described embodiment, and can be freely modified without departing from the spirit of the invention.

In the present embodiment, as the expression form of the virtual product VP, 3DCG is applied. However, the type of the preview image is not limited to 3DCG. For example, a two-dimensional image that expresses each page area 108 (FIG. 4) in a plan view may be applicable, or a stereoscopic image that adopts various methods such as a juxtaposition method, an image separation method, a parallax-division method, and polarized light display method also may be applicable.

What is claimed is:

1. An image editing apparatus that visualizes a virtual product obtained by simulating a final product which is obtained by a post-processing to at least one printed matter having a plurality of page areas, the apparatus comprising:
   a data acquisition unit that acquires imposition data for imposing a plurality of page areas on a sheet on which the printed matter is formed including post-processing information relating to the post-processing, and mapping data that indicates a correspondence relationship of the page areas between the printed matter and the virtual product;
   a position deviation amount estimation unit that estimates a two-dimensional position deviation amount for each page area which is generated at the time of post-processing with respect to the printed matter, based on the post-processing information; and
   an image creation unit that creates preview image data indicating the virtual product by mapping a page image indicating the page area on the printed matter shifted based on the estimated position deviation amount onto the page area on the virtual product with reference to the mapping data, and
   wherein
   sheet folding information of the printed matter is included in the post-processing information,
   the position deviation amount estimation unit estimates the deviation amount generated in the direction of a folding direction which is specified by the sheet folding information, and
   the position deviation amount estimation unit partitions the printed sheet into a fixed-side area where the position is fixed at the time of folding processing and a non-fixed-side area where the position is not fixed respectively with at least one folding line specified from sheet folding information as a reference in every single folding processing, and estimates the deviation amount of each page area which is different from one page area to another and is accumulated by each single folding processing in each page area belonging to the non-fixed-side area.

2. The image editing apparatus according to claim 1, wherein the image creation unit creates the preview image data that visualizes the virtual product using a three-dimensional shape model.

3. The image editing apparatus according to claim 2, wherein a sheet thickness of the sheet and sheet folding information of the printed matter are included in the post-processing information, and
   wherein the position deviation amount estimation unit estimates the deviation amount generated at the time of sheet folding processing of the printed matter using the sheet thickness and the sheet folding information.

4. The image editing apparatus according to claim 3, wherein the image creation unit creates the preview image data indicating the virtual product in which a cut out area exists or does not exist, according to the instruction operation of the user.

5. The image editing apparatus according to claim 2, wherein cutting information of the printed matter is included in the post-processing information, and wherein the position deviation amount estimation unit estimates the deviation amount generated at the time of the cutting processing of the printed matter using the cutting information.

6. The image editing apparatus according to claim 2, wherein the image creation unit creates the preview image data indicating the virtual product in which a cut out area exists or does not exist, according to the instruction operation of the user.

7. The image editing apparatus according to claim 6, further comprising:
a display unit that displays the virtual product based on the preview image data created by the image creation unit.

8. The image editing apparatus according to claim 2, further comprising:
a display unit that displays the virtual product based on the preview image data created by the image creation unit.

9. The image editing apparatus according to claim 1, wherein a sheet thickness of the sheet of the printed matter is included in the post-processing information, and
wherein the position deviation amount estimation unit estimates the deviation amount generated at the time of sheet folding processing of the printed matter using the sheet thickness and the sheet folding information.

10. The image editing apparatus according to claim 9, wherein the image creation unit creates the preview image data indicating the virtual product in which a cut out area exists or does not exist, according to the instruction operation of the user.

11. The image editing apparatus according to claim 1, wherein cutting information of the printed matter is included in the post-processing information, and
wherein the position deviation amount estimation unit estimates the deviation amount generated at the time of the cutting processing of the printed matter using the cutting information.

12. The image editing apparatus according to claim 11, wherein the image creation unit creates the preview image data indicating the virtual product in which a cut out area exists or does not exist, according to the instruction operation of the user.

13. The image editing apparatus according to claim 1, wherein the image creation unit creates the preview image data indicating the virtual product in which a cut out area exists or does not exist, according to the instruction operation of a user.

14. The image editing apparatus according to claim 13, further comprising:
a display unit that displays the virtual product based on the preview image data created by the image creation unit.

15. The image editing apparatus according to claim 1, further comprising:
a display unit that displays the virtual product based on the preview image data created by the image creation unit.

16. An image editing method in which the image editing apparatus according to claim 1 is used, the method comprising:
a step of acquiring imposition data for imposing a plurality of page areas on a sheet on which the printed matter is formed including post-processing information relating to the post-processing, and mapping data that indicates a correspondence relationship of the page areas between the printed matter and the virtual product;
a step of estimating a two-dimensional position deviation amount for each page area which is generated at the time of post-processing with respect to the printed matter, based on the post-processing information; and
a step of creating preview image data indicating the virtual product by mapping a page image indicating the page area on the printed matter shifted based on the estimated position deviation amount onto the page area on the virtual product with reference to the mapping data, and wherein
sheet folding information of the printed matter is included in the post-processing information,
the step of estimating a two-dimensional position deviation amount estimates the deviation amount generated in a direction of a folding direction which is specified by the sheet folding information, and
the step of estimating a two-dimensional position deviation amount estimates partitions the printed sheet into a fixed-side area where the position is fixed at the time of folding processing and a non-fixed-side area where the position is not fixed respectively with at least one folding line specified from sheet folding information as a reference in every single folding processing, and estimates the deviation amount of each page area which is different from one page area to another and is accumulated by each single folding processing in each page area belonging to the non-fixed-side area.

17. A non-transitory computer readable recording medium for visualizing a virtual product obtained by simulating a final product which is obtained by a post-processing to at least one printed matter having a plurality of page areas, the non-transitory computer readable recording medium causing a computer to execute:
a step of acquiring imposition data for imposing a plurality of page areas on a sheet on which the printed matter is formed including post-processing information relating to the post-processing, and mapping data that indicates a correspondence relationship of the page areas between the printed matter and the virtual product;
a step of estimation a two-dimensional position deviation amount for each page area which is generated at the time of post-processing with respect to the printed matter, based on the post-processing information; and
a step of creating preview image data indicating the virtual product by mapping a page image indicating the page area on the printed matter shifted based on the estimated position deviation amount onto the page area on the virtual product with reference to the mapping data, and wherein
sheet folding information of the printed matter is included in the post-processing information,
the step of estimating a two-dimensional position deviation amount estimates the deviation amount generated in the direction of a folding direction which is specified by the sheet folding information, and
the step of estimating a two-dimensional position deviation amount estimates partitions the printed sheet into a fixed-side area where the position is fixed at the time of folding processing and a non-fixed-side area where the position is not fixed respectively with at least one folding line specified from sheet folding information as a reference in every single folding processing, and estimates the deviation amount of each page area which is different from one page area to another and is accumulated by each single folding processing in each page area belonging to the non-fixed-side area.

* * * * *